(12) United States Patent
Guo

(10) Patent No.: US 9,330,260 B1
(45) Date of Patent: May 3, 2016

(54) DETECTING AUTO-START MALWARE BY CHECKING ITS AGGRESSIVE LOAD POINT BEHAVIORS

(71) Applicant: Symantec Corporation, Mountain View, CA (US)

(72) Inventor: Fanglu Guo, Los Angeles, CA (US)

(*) Notice: Subject to any disclaimer, the term of this patent is extended or adjusted under 35 U.S.C. 154(b) by 172 days.

(21) Appl. No.: 13/951,226

(22) Filed: Jul. 25, 2013

(51) Int. Cl.
*H04L 29/00* (2006.01)
*G06F 21/56* (2013.01)

(52) U.S. Cl.
CPC .................................. *G06F 21/566* (2013.01)

(58) Field of Classification Search
CPC ................................ G06F 21/00; G06F 21/56
See application file for complete search history.

(56) References Cited

U.S. PATENT DOCUMENTS

| | | | |
|---|---|---|---|
| 2006/0041942 A1* | 2/2006 | Edwards | 726/26 |
| 2007/0289019 A1* | 12/2007 | Lowrey | 726/24 |
| 2011/0191850 A1* | 8/2011 | Turbin | 726/24 |
| 2013/0239214 A1* | 9/2013 | Klein et al. | 726/24 |

\* cited by examiner

*Primary Examiner* — Brandon Hoffman
*Assistant Examiner* — Helai Salehi
(74) *Attorney, Agent, or Firm* — Patent Law Works LLP

(57) ABSTRACT

Program behaviors concerning load points are monitored, and a specific program attempting to actively maintain a previously set value of a specific load point is detected. In response, the specific program is adjudicated to be malware, and one or more actions are performed to protect the computer. The monitored behavior can be write operations targeting load points. In this scenario, the behavior indicating that a program is malware can comprise performing a requisite number of write operations to a load point within a requisite time period. The monitored behavior can also be altering load point values, and monitoring the results. The altering of load points can comprise removing values specifying programs to run, and/or changing names of programs. Detecting that a specific altered load point value has been automatically reset within a requisite time period to run the specific program upon start-up indicates that the program is malware.

21 Claims, 4 Drawing Sheets

DETECTING AUTO-START MALWARE BY CHECKING ITS AGGRESSIVE LOAD POINT BEHAVIORS

TECHNICAL FIELD

This disclosure pertains generally to computer security, and more specifically to detecting auto-start malware based on its aggressive use of load point behaviors.

BACKGROUND

Operating systems typically contain a mechanism for specifying applications to be loaded when the operating system starts-up. For example, Windows has specific locations in the registry that used to load applications, such as the Run (sub) key in the HKEY_CURRENT_USER key and the HKEY_LOCAL_MACHINE key. Such registry keys are known as load points. Values can be written to load points that specify files to be loaded and run during the operating system boot process. There are many legitimate reasons for an application to be loaded when the operating system starts-up, and these locations in Windows are used by many legitimate programs for benign purposes.

In addition to their legitimate use, load points can be used as attack vectors for malware such as viruses, Trojan horses, worms and spyware. Because the program specified by a load point is loaded each time the operating system starts-up, introducing malware into computer through a hacked load point allows the malware to survive a reboot. This makes load points an attractive target for propagators of malware.

Some anti-malware programs check the files that launch from registry load points, to detect whether they comprise known malware, or have suspicious characteristics such as a random name. However, new malware or malware that is not distributed by a suspicious source can go undetected by such checks.

It would be desirable to address this issue.

SUMMARY

Malware is detected on a computer, based on program behaviors targeting load points of the operating system. The load points specify programs to be run upon start-up of the operating system (e.g., when the operating system boots-up or when a specific user logs-in). Program behaviors concerning load points are monitored, and a specific program attempting to actively maintain a previously set value of a specific load point is detected. Responsive to this detected behavior, the specific program is adjudicated to be malware. One or more actions are performed to protect the computer from the malware, such as removing the malware from the computer, modifying the load point so that it no longer specifies to run the malware and/or sending information concerning the malware to a central security server.

The behavior monitoring can take the form of monitoring write operations targeting load points. In this scenario, the behavior indicating that the specific program is malware can comprise the program performing a requisite number of write operations to a specific load point within a requisite time period. More specifically, the program can be detected repeatedly writing a specific file name to the specific load point, wherein the file name specifies the program to run upon start-up of the operating system. The requisite time period can be a predefined amount of time (e.g., five seconds, five minutes, an hour) or until the next re-start of the operating system.

Instead or in addition, the behavior monitoring can take the form of altering values of load points, and monitoring the results. For example, the altering of load points can comprise removing values specifying programs to run upon operating system start-up, and/or changing names of programs in load point entries. Detecting that a specific altered load point value has been automatically reset within a requisite time period to run the specific program upon start-up indicates that the specific program is malware. This can comprise detecting that a specific removed value has been automatically written back to the load point, or that a specific changed program name has been automatically set back to the name of the specific program in the load point. In some embodiments, only load points specifying to run programs suspected of comprising malware are altered. The requisite time period can comprise a predefined amount of time (e.g., a second, a minute, five minutes) or until the next re-start.

Which load points to monitor (e.g., all or only a specific subset) can vary between embodiments as desired. Load points can comprise any operating system component specifying programs to run on start-up. Examples include specific keys in the registry (e.g., under Windows) or specific configuration files (e.g., under UNIX).

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
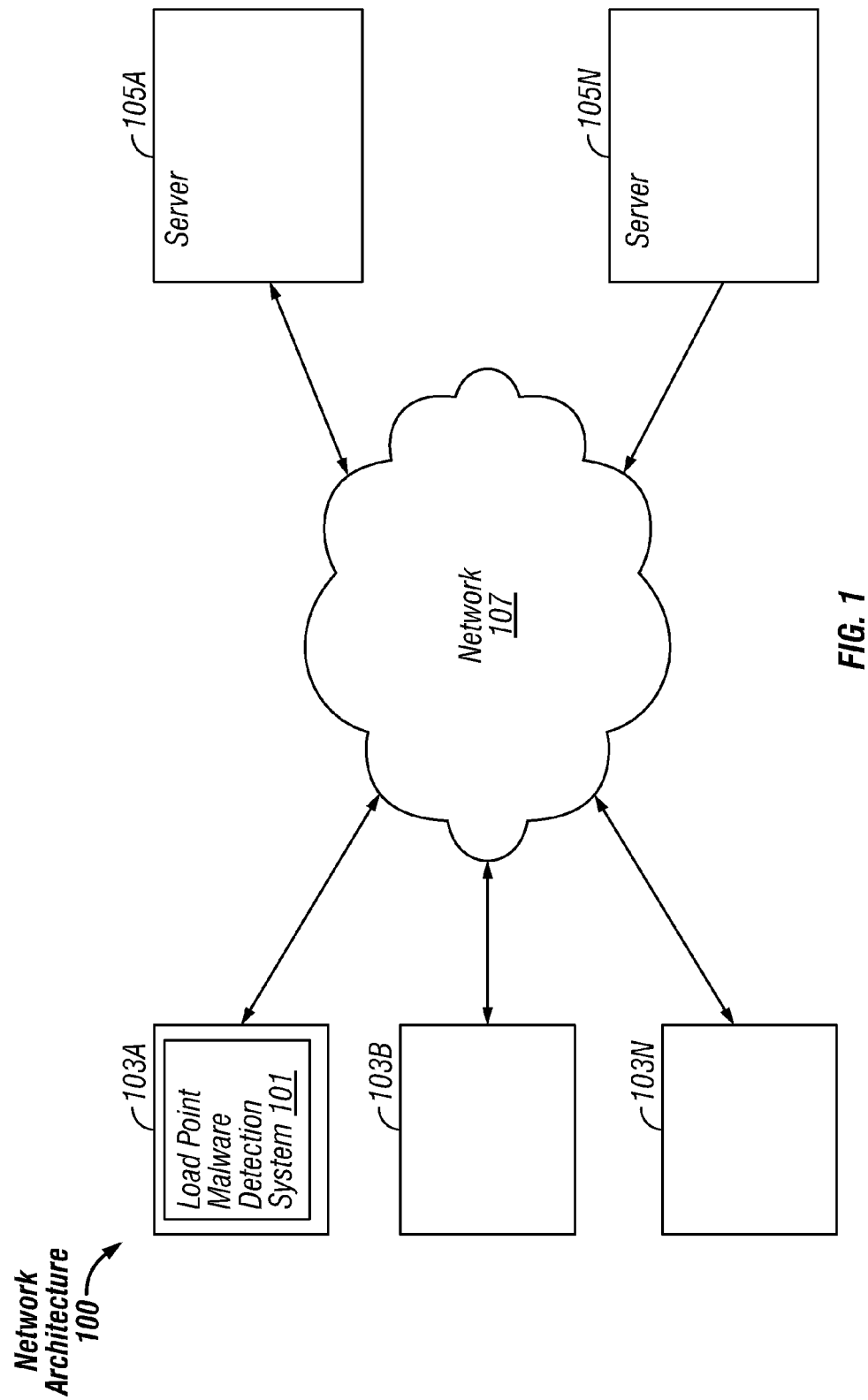
FIG. 1 is a block diagram of an exemplary network architecture in which a load point malware detection system can be implemented, according to some embodiments.

FIG. 1 is a block diagram illustrating an exemplary network architecture 100 in which a load point malware detection system 101 can be implemented. The illustrated network architecture 100 comprises multiple clients 103A, 103B and 103N, as well as multiple servers 105A and 105N. In FIG. 1, a load point malware detection system 101 is illustrated as residing on client 103A. It is to be understood that this is an example only, and in various embodiments various functionalities of this system 101 can be instantiated on a client 103, a server 105, or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applications and/or data on servers 105 using, for example, a web browser or other client software (not shown). Clients 103 can be in the form of desktop/laptop computers, or mobile computing devices, comprising portable computer systems capable of connecting to a network 107 and running applications. Such mobile computing devices are sometimes referred to as smartphones, although many mobile phones not so designated also have these capabilities. Tablet computers are another example of mobile computing devices.

Although FIG. 1 illustrates three clients 103 and two servers 105 as an example, in practice many more (or fewer) clients 103 and/or servers 105 can be deployed. In one embodiment, the network 107 is in the form of the Internet. Other networks 107 or network-based environments can be used in other embodiments.

Figure 2:
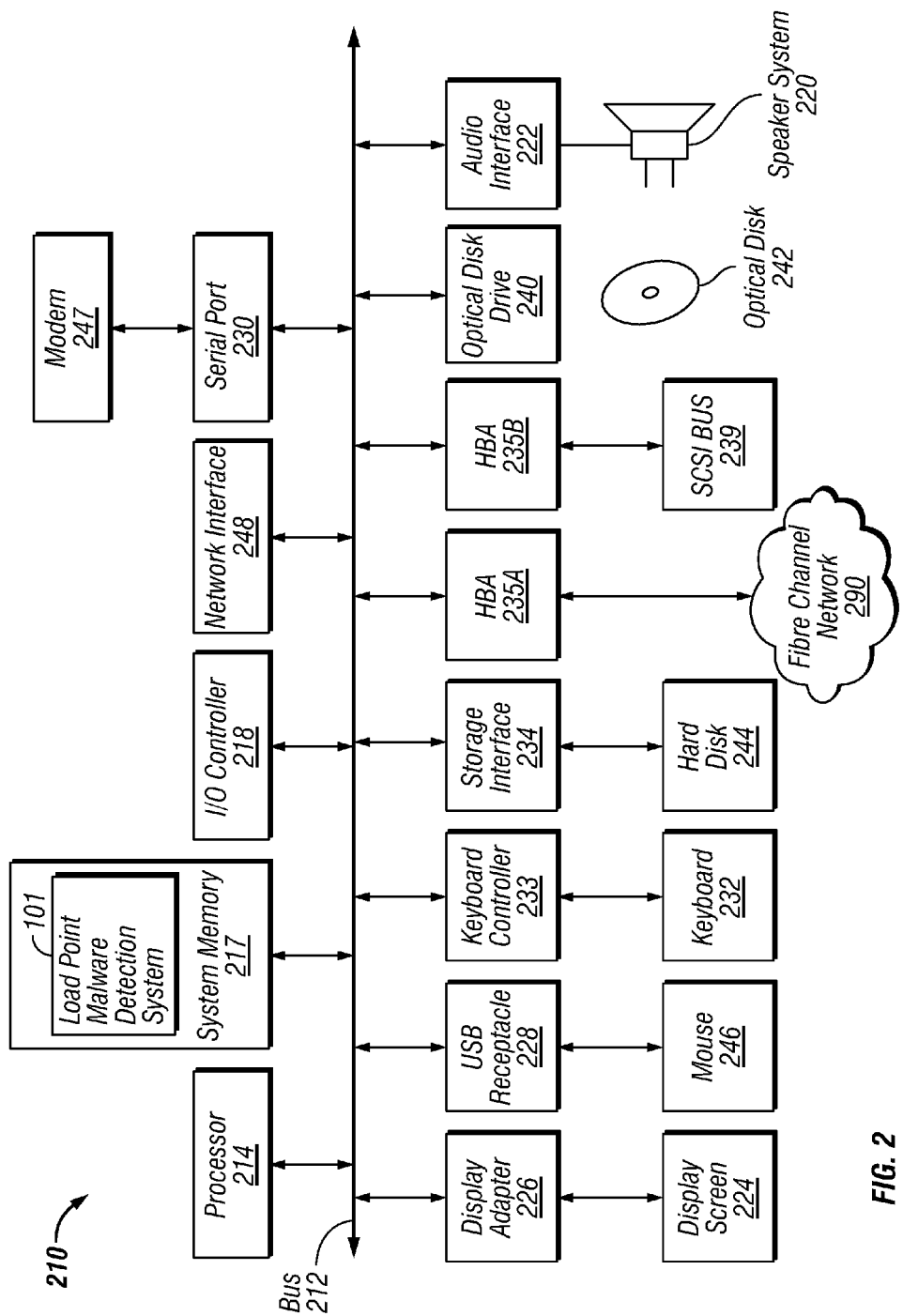
FIG. 2 is a block diagram of a computer system suitable for implementing a load point malware detection system, according to some embodiments.

FIG. 2 is a block diagram of a computer system 210 suitable for implementing a load point malware detection system 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker 220, a display adapter 226 communicatively coupled to an external video output device such as a display screen 224, one or more interfaces such as Universal Serial Bus (USB) receptacles 228, serial ports 230, parallel ports (not illustrated), etc., a keyboard controller 233 communicatively coupled to a keyboard 232, a storage interface 234 communicatively coupled to at least one hard disk 244 (or other form(s) of magnetic media), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 2 need not be present (e.g., smartphones and tablets typically do not have optical disk drives 240, external keyboards 242 or external pointing devices 246, although various external components can be coupled to mobile computing devices via, e.g., USB receptacles 228). The various components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the load point malware detection system 101 is illustrated as residing in system memory 217. The workings of the load point malware detection system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
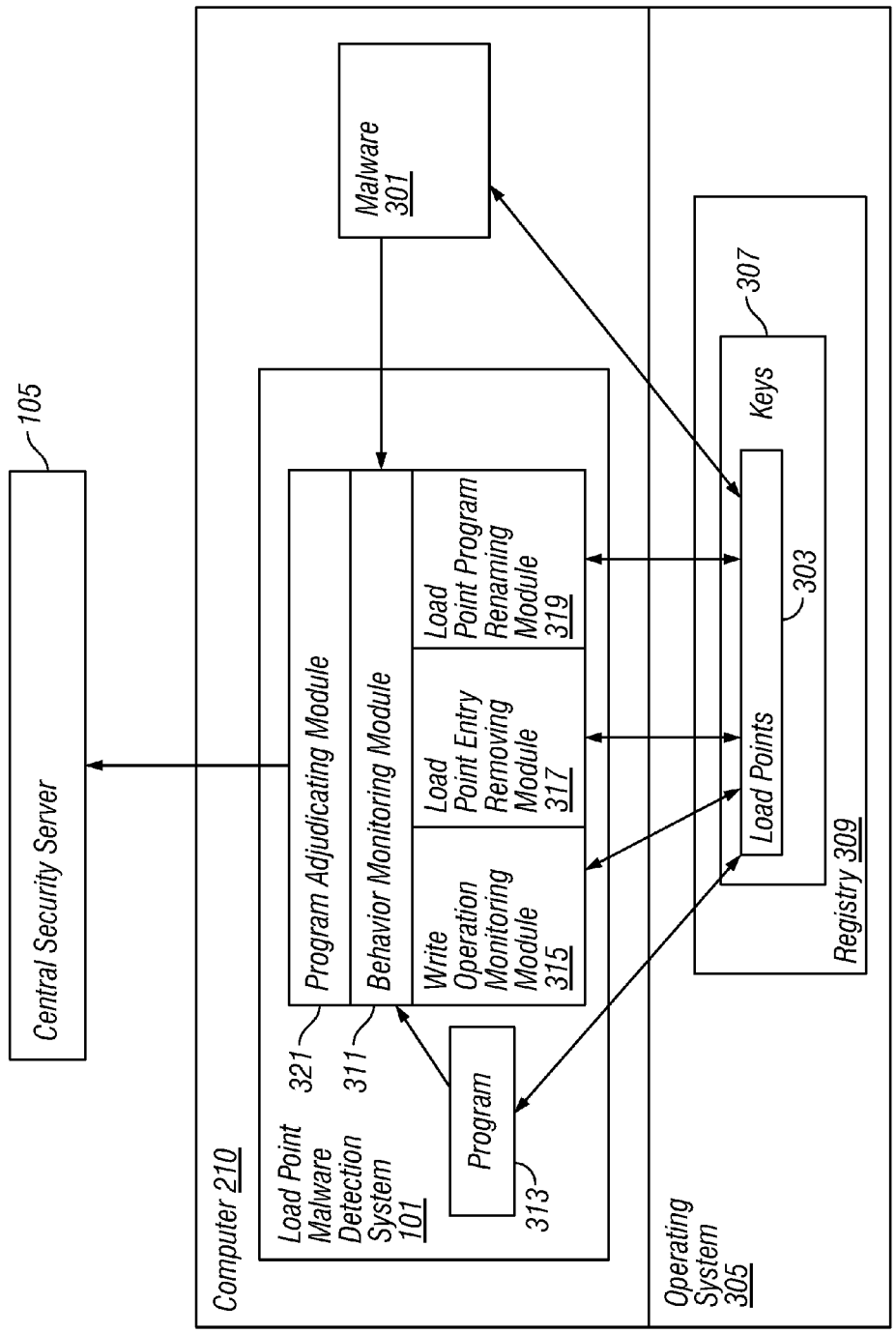
FIG. 3 is a block diagram of the operation of a load point malware detection system, according to some embodiments.

FIG. 3 illustrates the operation of a load point malware detection system 101, according to some embodiments. As described above, the functionalities of the load point malware detection system 101 can reside on a client 103, a server 105, or be distributed between multiple computer systems 210, including within a cloud-based computing environment in which the functionality of the load point malware detection system 101 is provided as a service over a network 107. It is to be understood that although the load point malware detection system 101 is illustrated in FIG. 3 as a single entity, the illustrated load point malware detection system 101 represents a collection of functionalities, which can be instantiated as a single or multiple modules as desired (an instantiation of specific, multiple modules of the load point malware detection system 101 is illustrated in FIG. 3). It is to be understood that the modules of the load point malware detection system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the load point malware detection system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, a load point malware detection system 101 runs on a computer 210 (e.g., a client 103) and detects malware 301 based on its aggressive behavior directed towards a load point 303 in the operating system 305. Although FIG. 3 illustrates the load points 303 as being in the form of specific keys 307 in the registry 309 of the operating system 305 (e.g., Windows), in other embodiments the load points 303 are in other formats (e.g., under different operating systems 305), as described in detail below.

As noted above, some malware 301 infects computers 210 by setting the value of a load point 303 to run a file containing malware 301 when the operating system 305 starts-up. Because it is an important goal of such malware 301 to remain present on an infected computer 210 across reboots, the malware 301 often aggressively protects its hacked load point 303. To do so, the malware prevents the user and other programs 313 from removing or modifying the value of the infected load point 303. By actively detecting such aggressive protection of the hacked value of a load point 303, the load point malware detection system 101 is able to identify malware 301 that has infected a computer 310 through a load point 303 based attack, even where the malware 301 evades conventional load point 303 based detection techniques that rely on factors such as the examination of the values of the load points 303 themselves (i.e., the file names of the programs 313 the load points 303 have been set to run when the operating system 305 starts-up).

A behavior monitoring module 311 of the load point malware detection system 101 performs this functionality by monitoring the behavior of programs 313 concerning given load points 303, and detecting load point 303 based behavior that indicates that the program 313 is malware 301. For example, in one embodiment the behavior monitoring module 311 monitors write operations targeting specific load points 303. To perform this functionality, a write operation monitoring module 315 of the load point malware detection system 101 monitors writes to specific load points 303 being monitored, and is thus able to detect repeated write operations to a particular load point 303. This is one way to detect malware 301 that preserves itself across reboots by repeatedly writing the name of the malicious file to be run at start-up to the load point 303 it uses as an attack vector (the Zeus Trojan horse is an example of malware 301 that works this way). By writing the name of a file containing malware 301 to a given load point 303 over and over, the malware 301 is taking a step to ensure that the load point 303 remains infected, even if the file name is found to be suspicious and removed from the load point 303. If the malware 301 writes the file name back to the load point 303 repeatedly, scanning the registry 309 and removing the suspected file name from the given load point 303 is only effective until the malware 301 writes the name back again. Even if the registry 309 is scanned and cleaned again at a later time, a frequent, aggressive rewriting of the value to the load point 303 (e.g., once a second, once a minute, once every five minutes) is likely to occur more frequently than even relatively frequent anti-malware scans (e.g., once an hour, once a day), and thus the load point 303 is likely to be infected with the malware 301 at boot time.

The write operation monitoring module 315 monitors write operations targeting the load points 303 being monitored, and detects any such suspicious repeated writes to a specific one of them. The level of repetition of writing to a given load point 303 that warrants flagging the program 313 that does the writing as suspicious is a variable design parameter. The write operation monitoring module 315 uses different values for this parameter in different embodiments, and/or adjusts this value up and/or down as desired. On the more sensitive end of the detection spectrum, the write operation monitoring module 315 can flag more than a single write to a specific load point 303 between reboots by a single program 313. In other words, as few as two writes of the same value to a given load point 303 between reboots can be considered suspicious. In other embodiments, only a larger number of rewrites between successive reboots is considered suspicious (e.g., 3, 5, 10, 30). In some embodiments, in addition to or instead of flagging a requisite number of writes of the same value to a specific load point 303 between reboots, the write operation monitoring module 315 flags a given number (e.g., 3, 10, 30) of writes to a specific load point 303 within a given amount of time (e.g., 5 seconds, 5 minutes, an hour) as suspicious. The specific number of writes and the amount of time are variable design parameters, and different values can be used in different embodiments. In some embodiments, multiple writes made by a combination of different programs 313 can be flagged as suspicious, because the malware 301 could change or otherwise hide its name over time, or use more than one executable image to control the infected load point 303. Multiple repeated writes even across multiple reboots of the operating system 305 can also be flagged as suspicious in some embodiments. In some embodiments, the multiple writes made to a specific load point 303 need not all be of the same exact value to be flagged, because the malware 301 can be stored in multiple files with different names, or the name of the malicious file can be changed over time. The exact form of the content being written to a load point 303 also varies under different operating systems 305. For example, under current version of Windows, the data value used for a key 307 is in the form of a command line entry. To register a program 313 to run at start-up, an entry is written to the given load point 303 in the form description-string=commandline. Multiple entries can be written under a key 307, and thus multiple programs 313 can be registered under a single load point 303.

The write operation monitoring module 315 can detect writes made to the load points 303 by hooking the API ("Application Programming Interface") for affecting changes to the specific components used by the given operating system 305 as load points 303. For example, under current versions of Windows, the write operation monitoring module 315 can hook the Windows API for changing the values of the registry keys 307. Under other operating systems 305, other calls can be intercepted (non-Windows based embodiments are discussed in greater detail below). Either way, by hooking the appropriate system calls or functionalities that are capable of setting and/or changing the values of the components that specify to the given operating system 305 which programs to load at start-up, the write operation monitoring module 315 can detect individual write operations targeting a given load point 303, determine the program 313 that is performing the write operation, and identify the content that the program 313 is writing to the load point 303. The write operation monitoring module 315 can thus track write operations made by different programs 313 targeting specific load points 303 with various content over time, and identify programs 313 engaging in behavior considered suspicious according to the given suspiciousness parameters used in given embodiments. Responsive to a given program engaging in a requisite level of suspicious behavior, a program adjudicating module 321 of the load point malware detection system 101 adjudicates the program 313 as being malware 303. The processing of programs 313 adjudicated to be malware 301 is described below.

In other embodiments, rather than monitoring write operations, the behavior monitoring module 311 alters the values of load points 303 and monitors the results. In one such embodiment, a load point entry removing module 317 of the load point malware detection system 101 attempts to remove specific values from load points 303 being monitored, and determines whether a removed entry is added back automatically. More specifically, for a given load point 303 being monitored (e.g., the HKCU\Software\Microsoft\Windows\CurrentVersion\Run key 307 in the Windows registry 309), the load point entry removing module 317 removes one or more entries specifying to run a given program 313. To remove an entry from a load point 303, the load point entry removing module 317 can utilize the API for affecting changes to the specific components used as load points 303 by the given operating system 305. For example, under current versions of Windows, the load point entry removing module 317 can call the Windows API for changing the values of the registry keys 307.

Once a given entry has been removed from a specific load point 303, the load point 303 is monitored to determine whether the entry is written back to the load point 303 within a requisite amount of time. If so, the load point entry removing module 317 flags the program 313 that is the target of the entry (i.e., the program 313 that the entry specifies to load) as being suspicious. This is the case because the program 313 has engaged in the suspicious behavior of automatically rewriting its entry to a load point 303 after the entry has been removed. This indicates that the program 313 is itself monitoring the load point 303, and has detected that its entry has been removed (or, in any case, that the program 313 is repeatedly writing its entry to the load point 303). The requisite amount of time during which to monitor the load point 303 and flag a write-back of the entry as suspicious can vary between embodiments and scenarios as desired, ranging for example from within a second, to within ten minutes, to until the system is re-started. Which entries to remove is also a variable design parameter. In some embodiments, the load point entry removing module 317 only removes entries that are suspected of being malware 301, for example because of their source, reputation, behavior or other factors. What specific factor(s) result in a program 313 being suspected of maliciousness vary between embodiments. Regardless, whether or not the suspected program 313 actually comprises malware 301 can then confirmed by its behavior after the removal of its entry from the load point 303. In other embodiments, any entry not known to be benign (e.g., entries of unknown status as well as those specifically suspected) is removed from a monitored load point 303, to determine whether the entry is written-back, and thus whether the program 313 is malware 301.

In another embodiment, rather than attempting to remove entries from load points 303, a load point program renaming module 319 of the load point malware detection system 101 attempts to rename the programs 313 specified in load point entries of interest, and the load point 303 is then monitored to determine whether the program name in the entry is automatically set back within a requisite time frame. As with the entry removal technique described above, which program entries are renamed and the amount of time in which an automatic re-set is flagged as suspicious can vary between embodiments. Changing the program name in a load point entry is another way of perturbing the load point 303, and determining whether its value is automatically reset, which is a form of suspicious program 313 behavior directed at a load point 303.

Responsive to a load point entry being written back or renamed within the requisite time period, the program adjudicating module 321 adjudicates the program 313 that is specified by the load point 303 as being malware 303. Programs 313 adjudicated to be malware are processed as described below. Where the load point entry is not written back or renamed within the requisite time period, the program adjudicating module 321 adjudicates the program 313 to be benign (or of unknown status). In this case, the corresponding removed load point entry is restored or the corresponding changed program name is changed back to its original name.

It is to be understood that which specific load points 303 to monitor can vary between embodiments. In current versions of Windows, examples of registry keys 307 used as load points 303 include the following subkeys under both HKEY_CURRENT_USER and HKEY_LOCAL_MACHINE: \SOFTWARE\Microsoft\Windows\CurrentVersion\Run, \SOFTWARE\Microsoft\Windows\CurrentVersion\RunOnce, \SOFTWARE\Microsoft\Windows\CurrentVersion\RunServices, \SOFTWARE\Microsoft\Windows\CurrentVersion\RunServicesOnce, \SOFTWARE\Microsoft\Windows\CurrentVersion\Policies\Explorer\Run. Other examples include HKEY_CLASSES_ROOT\comfile\shell\open\command, HKEY_CLASSES_ROOT\piffle\shell\open\command, HKEY_CLASSES_ROOT\exefile\shell\open\command and HKEY_CLASSES_ROOT\txtfile\shell\open\command. Some or all of these load points 303 can be monitored. Note that these examples are not exhaustive. Additionally, the names and configurations of these keys 307 differ between versions of Windows, and are subject to change in future versions thereof. Any registry key 307 that can be used to automatically load a program 313 as part of the operating system 305 start-up process can be monitored in different embodiments. It is to be further understood that the various techniques described above for detecting suspicious program 313 behavior targeting load points 303 (monitoring writes, removing entries, changing program names) can be used individually or in any combination as desired.

In different embodiments, different actions can be taken to protect the computer 210 in response to adjudicating that a given program 313 is malware 301. In one embodiment, the program 313 is removed from the computer 210 and the load point 303 that was being used as its attack vector is cleaned, in order to remove the entry used to load the malicious program 313 so that the load point 303 no longer specifies to load the malware 301. In addition (or instead), the adjudication (and optionally additional information concerning the program 313) can be sent to a central security server 105 which receives reports from multiple clients 105 deployed at different locations, and utilizes this information to take future actions to protect against the malware 301. In one embodiment, instead of explicitly adjudicating the program 313 to be malware in response to a given level of suspicious activity concerning its load point based 303 behavior, this information is used as one of a plurality of factors in categorizing the suspiciousness level of the program 313, and the final adjudication is made in response to multiple factors, e.g., by a central server level anti-malware program (not illustrated).

Note that although the above based discussion is centered on embodiments in which the load points 303 are in the form of Windows registry keys 307, the above described functionality is applied to load points 303 in different formats under other operating systems 305 in other embodiments. For example, in UNIX and UNIX-like operating systems 305 such as Linux, the load point malware detection system 101 monitors the configuration files that specify which programs 313 are loaded on start-up, such as the system wide configuration files stored in, e.g., /etc/ and its subdirectories or in /usr/local/etc, as well as user specific configuration files typically stored in hidden files and directories that start with a period in the given user's home directory. The load point malware detection system 101 monitors these files to detect the above described behaviors (e.g., repeated writes, fast rewriting of removed entries, fast resetting of changed program names). Under other operating systems 305, other system level components that specify programs 313 to be loaded on start-up are monitored (e.g., the Object Data Manager (ODM) under AIX, property list files under MAC OS, etc.). Additionally, some versions of Windows can specify programs to run at start-up using mechanisms other than registry keys 303 (e.g., INI files, XML-based configuration files, etc.), and in some embodiments these other mechanisms are monitored accordingly.

Note also that in addition to loading programs 313 when an operating system is initially booted, load points 303 can also be used to load programs 313 when a specific user logs-in to the operating system 313 and the operating system executes a start-up process for that user. The load point malware detection system 101 can execute the above-described functionality targeting either or both start-up scenario in different embodiments.

Figure 4:
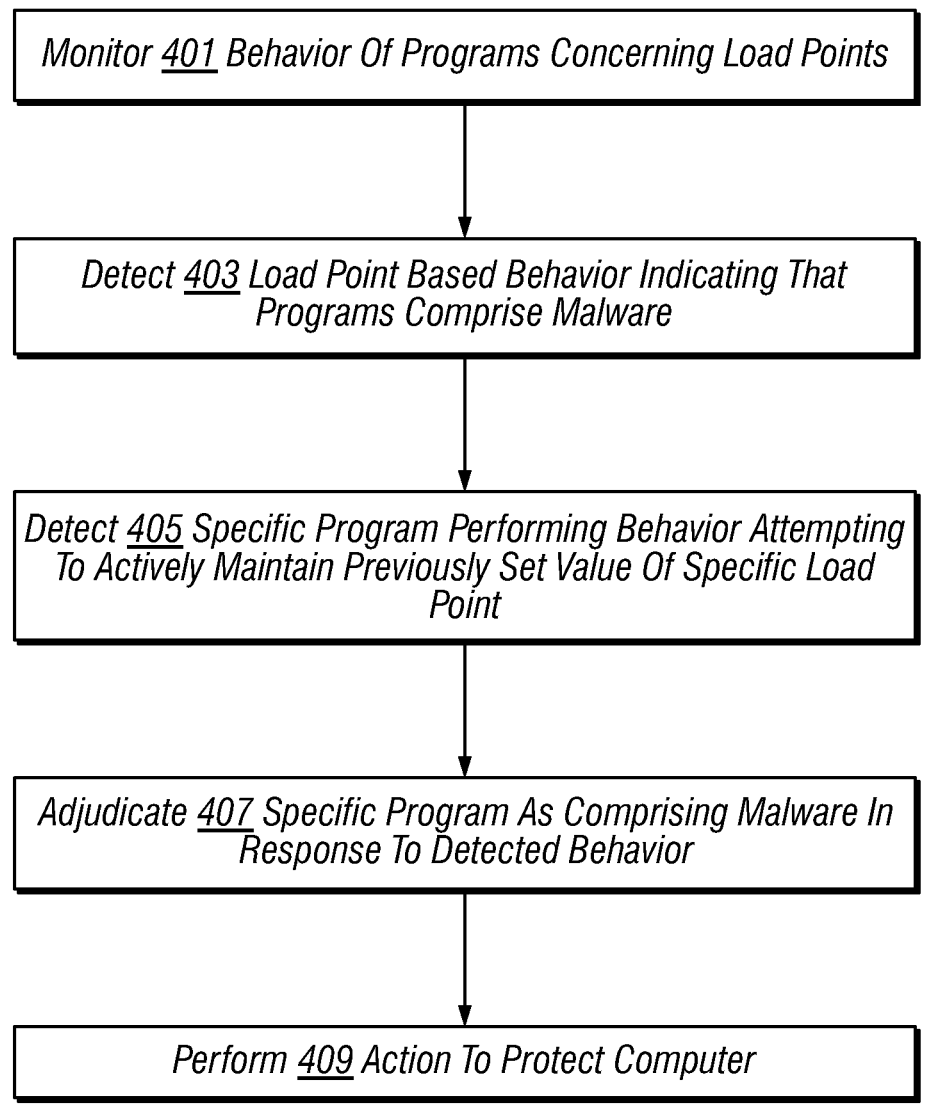
FIG. 4 is a flowchart of the operation of a load point malware detection system, according to some embodiments.

FIG. 4 illustrates steps of the operation of a load point malware detection system 101, according to some embodiments. The behavior monitoring module 311 monitors 401 the behavior of programs 313 concerning given load points 303, and detects 403 load point 303 based behavior that indicates that programs 313 comprise malware 301. The behavior monitoring module 311 detects 405 a specific program 313 performing a behavior targeting a specific load point 303, wherein the detected behavior attempts to actively maintain a previously set value of the specific load point 303 specifying a program 313 to run upon start-up of the operating system 305. The program adjudicating module 321 adjudicates 407 that the specific program 313 comprises malware 301, in response to the detected behavior. In response to adjudicating that the specific program 313 comprises malware 301, the program adjudicating module 321 performs 409 at least one action to protect the computer 210, such as removing the malware 310 from the computer 210, modifying the load point 303 so that it no longer specifies to run the malware 301 and/or sending information concerning the malware 301 to a central security server 105.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for detecting malware based on program behaviors targeting load points of an operating system, the method comprising the steps of:
   monitoring behaviors of programs concerning operating system load points, by a computer, wherein the load points specify programs to be run upon start-up of the operating system;
   responsive to detecting a specific program writing a set value to a specific load point, the set value specifying a program to run upon start-up of the operating system, updating the set value at the load point to prevent the potential malware to run upon start-up of the operating system;
   detecting the specific program behavior of attempting to actively maintain a previously set value of the specific load point to run the program upon start-up of the operating system;
   responsive to the detected behavior, adjudicating that the specific program comprises malware, by the computer; and
   performing at least one action to protect the computer from the malware, responsive to adjudicating that the specific program comprises malware.

2. The method of claim 1 wherein:
   monitoring behaviors of programs concerning operating system load points further comprises monitoring write operations targeting load points; and
   detecting the specific program performing the behavior targeting the specific load point further comprises detecting that the specific program performs a requisite number of write operations to the specific load point within a requisite time period.

3. The method of claim 1 wherein:
   monitoring behaviors of programs concerning operating system load points further comprises altering values of load points specifying programs to run upon start-up of the operating system, and monitoring results of altering the values; and
   detecting the specific program performing the behavior targeting the specific load point further comprises detecting that a specific altered load point value has been automatically reset within a requisite time period, to specify to run the specific program upon start-up of the operating system.

4. The method of claim 1 wherein load points further comprise:
   specific keys in a registry of the operating system, the specific keys specifying programs to run upon start-up of the operating system.

5. The method of claim 1 wherein load points further comprise:
   specific configuration files specifying programs to run upon start-up of the operating system.

6. The method of claim 1 wherein start-up of the operating system further comprises:
   the operating system booting-up on the computer.

7. The method of claim 1 wherein start-up of the operating system further comprises:
   a specific user logging-in to the operating system and the operating system executing a start-up process concerning the specific user.

8. The method of claim 1 wherein monitoring behaviors of programs concerning operating system load points further comprises:
   only monitoring behaviors of programs targeting a specific subset of the operating system load points.

9. The method of claim 1 wherein performing at least one action to protect the computer from the malware, responsive to adjudicating that the specific program comprises malware further comprises:
   removing the specific program adjudicated to comprise malware from the computer.

10. The method of claim 1 wherein performing at least one action to protect the computer from the malware, responsive to adjudicating that the specific program comprises malware further comprises:
    modifying the specific load point so that it no longer specifies to run the specific program adjudicated to comprise malware.

11. The method of claim 1 wherein performing at least one action to protect the computer from the malware, responsive to adjudicating that the specific program comprises malware further comprises:
    sending information concerning the specific program adjudicated to comprise malware to a central security server.

12. The method of claim 1, wherein detecting the specific program behavior of attempting to actively maintain a previously set value comprises:

detecting the specific program behavior of attempting to actively maintain a previously set value prior to rebooting.

13. The method of claim 2 wherein detecting that the specific program performs a requisite number of write operations to the specific load point within a requisite time period further comprises:

detecting that the program repeatedly writes a specific file name to the specific load point, the file name specifying the program to run upon start-up of the operating system.

14. The method of claim 2 wherein the requisite time period comprises one from a group of time periods consisting of:

a predefined amount of time; and
    an amount of time from detection of a first operation that writes the specific file name to the specific load point until a re-start of the operating system.

15. The method of claim 3 wherein:

altering values of load points specifying programs to run upon start-up of the operating system further comprises removing values from load points specifying programs to run upon start-up of the operating system; and
    detecting that the specific altered load point value has been automatically reset to specify to run the specific program upon start-up of the operating system further comprises detecting that a specific removed value specifying to run the specific program upon start-up of the operating system has been automatically written back to the specific load point.

16. The method of claim 3 wherein:

altering values of load points specifying programs to run upon start-up of the operating system further comprises changing names of programs specified in load points to run upon start-up of the operating system; and
    detecting that the specific altered load point value has been automatically reset to specify to run the specific program upon start-up of the operating system further comprises detecting that a specific changed program name has been automatically set back to the name of the specific program in the specific load point.

17. The method of claim 3 wherein altering values of load points specifying programs to run upon start-up of the operating system further comprises:

only altering values of load points specifying to run programs suspected of comprising malware upon start-up of the operating system.

18. The method of claim 3 wherein the requisite time period comprises one from a group of time periods consisting of:

a predefined amount of time; and
    an amount of time from altering a value of a specific load point until a re-start of the operating system.

19. At least one non-transitory computer readable-storage medium for detecting malware based on program behaviors targeting load points of an operating system, the at least one non-transitory computer readable-storage medium storing computer executable instructions that, when loaded into computer memory and executed by at least one processor of a computing device, cause the computing device to perform the following steps:

monitoring behaviors of programs concerning operating system load points, by a computer, wherein the load points specify programs to be run upon start-up of the operating system;
    responsive to detecting a specific program writing a set value to a specific load point, the set value specifying a program to run upon start-up of the operating system, updating the set value at the load point to prevent the potential malware to run upon start-up of the operating system;
    detecting the specific program behavior of attempting to actively maintain a previously set value of the specific load point to run the program upon start-up of the operating system;
    responsive to the detected behavior, adjudicating that the specific program comprises malware, by the computer; and
    performing at least one action to protect the computer from the malware, responsive to adjudicating that the specific program comprises malware.

20. The at least one non-transitory computer readable-storage medium of claim 19 wherein:

monitoring behaviors of programs concerning operating system load points further comprises monitoring write operations targeting load points; and
    detecting the specific program performing the behavior targeting the specific load point further comprises detecting that the specific program performs a requisite number of write operations to the specific load point within a requisite time period.

21. A computer load point malware detection system for detecting malware based on program behaviors targeting load points of an operating system, the computer load point malware detection system comprising:

at least one processor;
    system memory;
    a behavior monitoring module residing in the system memory, the behavior monitoring module being programmed to monitor behaviors of programs concerning operating system load points, wherein the load points specify programs to be run upon start-up of the operating system, responsive to detecting a specific program writing a set value to a specific load point, the set value specifying a program to run upon start-up of the operating system, updating the set value at the load point to prevent the potential malware to run upon start-up of the operating system and further to detect the specific program behavior of attempting to actively maintain a previously set value of the specific load point to run the program upon start-up of the operating system; and
    a program adjudicating module residing in the system memory, the program adjudicating module being programmed to adjudicate that the specific program comprises malware, responsive to the detected behavior, and further to perform at least additional one action to protect the system from the malware, responsive to adjudicating that the specific program comprises malware.

* * * * *